(12) United States Patent
Gu (10) Patent No.: US 11,307,349 B2
(45) Date of Patent: Apr. 19, 2022

(54) BACKLIGHT MODULE AND DISPLAY MODULE

(71) Applicant: WUHAN CHINA STAR OPTOELECTRONICS TECHNOLOGY CO., LTD., Hubei (CN)

(72) Inventor: Hua Gu, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 265 days.

(21) Appl. No.: 16/632,110

(22) PCT Filed: Nov. 14, 2019

(86) PCT No.: PCT/CN2019/118249
§ 371 (c)(1),
(2) Date: Jan. 17, 2020

(87) PCT Pub. No.: WO2021/017311
PCT Pub. Date: Feb. 4, 2021

(65) Prior Publication Data
US 2021/0405284 A1    Dec. 30, 2021

(30) Foreign Application Priority Data
Jul. 29, 2019 (CN) .......................... 201910689942.8

(51) Int. Cl.
F21V 8/00 (2006.01)

(52) U.S. Cl.
CPC ........... *G02B 6/0088* (2013.01); *G02B 6/009* (2013.01); *G02B 6/0083* (2013.01)

(58) Field of Classification Search
CPC ..... G02B 6/0088; G02B 6/0083; G02B 6/009
See application file for complete search history.

(56) References Cited

U.S. PATENT DOCUMENTS

| 9,250,471 B2 | 2/2016 | Norihiro et al. |
| 9,507,193 B2 | 11/2016 | Kazuya et al. |
| 2016/0209570 A1* | 7/2016 | Zhu ....................... G02B 6/0068 |

(Continued)

FOREIGN PATENT DOCUMENTS

| CN | 201811094 U | 4/2011 |
| CN | 103728771 A | 4/2014 |
| CN | 104520759 A | 4/2015 |

(Continued)

*Primary Examiner* — Mary Ellen Bowman (57) ABSTRACT

A backlight module and a display module are provided. The backlight module includes a back plate, a light guide plate, and a light source. The back plate includes a receiving cavity. One side of the back plate is formed with a through hole. The light guide plate is disposed in the receiving cavity. A light incident surface of the light guide plate corresponds to the through hole, the light source is disposed in the through hole, and the light source corresponds to the light incident surface of the light guide plate. By forming the through hole on one side of the back plate and providing the light source in the through hole, a side frame is not required to be provided, a thickness of a frame of the backlight module is reduced, and a narrow frame is realized.

17 Claims, 4 Drawing Sheets

(56) References Cited

U.S. PATENT DOCUMENTS

2021/0223464 A1\* 7/2021 Zhang ............... G02F 1/133608

FOREIGN PATENT DOCUMENTS

| CN | 107247364 A | 10/2017 |
|---|---|---|
| CN | 109270723 A | 1/2019 |
| JP | 2010122330 A | 6/2010 |
| TW | 201502666 A | 1/2015 |

\* cited by examiner

BACKLIGHT MODULE AND DISPLAY MODULE

FIELD OF INVENTION

The present disclosure relates to the field of display technologies, and more particularly to a backlight module and a display module.

BACKGROUND OF INVENTION

With the development of display industry technologies, full screen technologies have become a major development trend, and narrow bezel designs of display panels are becoming more and more important.

Current display modules include a display panel, a backlight module, and a flexible circuit board. The flexible circuit board is bound to the display panel and then bent to a back surface of the backlight module. When a side-lit backlight module is used, since a light source is usually disposed on a side of a back frame, a thickness of the back frame is large, a width of a lower frame of the display panel is likely to be large, which cannot meet a requirement of a narrow frame.

Therefore, the current display module has a technical problem that the width of the lower frame is large, and needs to be improved.

SUMMARY OF INVENTION

The present application provides a backlight module and a display module to alleviate a technical problem that a width of a lower frame in a current display module is large.

To solve the above issues, a technical solution provided by an embodiment of the present application is as follows.

An embodiment of the present application provides a backlight module. The backlight module includes a back plate, a light guide plate, and a light source. The back plate includes a receiving cavity disposed therein, and a side of the back plate is provided with a through hole. The light guide plate is disposed in the receiving cavity, and a light incident surface of the light guide plate corresponds to the through hole. The light source is disposed in the through hole, and the light source corresponds to the light incident surface of the light guide plate.

In an embodiment of the present application, the back plate includes a bottom plate, a top plate, and a first side plate and a second side plate that are oppositely disposed, the bottom plate, the first side plate, the second side plate, and the top plate are connected to each other to form the through hole.

In an embodiment of the present application, the top plate is formed separately from other portions of the back plate.

In an embodiment of the present application, a distance between the light incident surface of the light guide plate and a second side surface of the bottom plate is greater than or equal to a length of the light source.

In an embodiment of the present application, a height of the light guide plate is greater than or equal to a height of the light source.

In an embodiment of the present application, a first side surface of the top plate is flush with a second side surface of the bottom plate.

In an embodiment of the present application, the backlight module further includes a black and white double-sided tape disposed on a light emitting surface of the light guide plate and corresponding to the top plate.

An embodiment of the present application further provides a display module. The display module includes a backlight module, a display panel, and a flexible circuit board. The backlight module includes a back plate, a light guide plate, and a light source. The back plate includes a receiving cavity disposed therein, a side of the back plate is provided with a through hole, the light guide plate is disposed in the receiving cavity, a light incident surface of the light guide plate corresponds to the through hole, the light source is disposed in the through hole, and the light source corresponds to the light incident surface of the light guide plate. The display panel is disposed in a light emitting direction of the backlight module. The flexible circuit board is bound to the display panel and bent to a bottom surface of the back plate to be attached to the through hole and the bottom surface of the back plate.

In an embodiment of the present application, the light source is disposed on a side of the flexible circuit board adjacent to the back plate.

In an embodiment of the present application, the back plate includes a bottom plate, a top plate, and a first side plate and a second side plate that are oppositely disposed, the bottom plate, the first side plate, the second side plate, and the top plate are connected to each other to form the through hole.

In an embodiment of the present application, the top plate is formed separately from other portions of the back plate.

In an embodiment of the present application, a distance between the light incident surface of the light guide plate and a second side surface of the bottom plate is greater than or equal to a length of the light source.

In an embodiment of the present application, a height of the light guide plate is greater than or equal to a height of the light source.

In an embodiment of the present application, a first side surface of the top plate is flush with a second side surface of the bottom plate.

In an embodiment of the present application, the backlight further includes a black and white double-sided tape disposed on a light emitting surface of the light guide plate and corresponding to the top plate.

In an embodiment of the present application, the display module further includes an adhesive layer disposed on a side of the flexible circuit board adjacent to the back plate and located at two sides of the light source, and the adhesive layer is configured to bond the back plate and the flexible circuit board.

In an embodiment of the present application, the flexible circuit board includes a reflective area disposed around the light source, and the reflective area is provided with a reflective film.

In an embodiment of the present application, the display module further includes a reinforcing plate disposed on a side of the flexible circuit board away from the back plate and corresponding to the light source.

In an embodiment of the present application, the reinforcing plate is made of metal.

In an embodiment of the present application, the display module further includes a driving chip disposed on a side of the flexible circuit board adjacent to the back plate and attached to the bottom surface of the back plate.

Beneficial effects of an embodiment of the present disclosure are that, an embodiment of the present invention provides a backlight module and a display module. The backlight module includes a back plate, a light guide plate and a light source. The back plate defines a receiving cavity. One side of the back plate is formed with a through hole. The light guide plate is formed. The light incident surface of the light guide plate is disposed in the through hole; the light source is disposed in the through hole, and the light source corresponds to a light incident surface of the light guide plate. By forming a through hole on one side of the back plate and disposing the light source in the through hole, the side frame is not required to be disposed at the light source, and the thickness of the original side frame is completely eliminated, thereby reducing the thickness of the backlight module frame. After assembling the display module with the display panel, the width of the lower frame of the display module is reduced, and a narrow bezel design is realized.

DESCRIPTION OF DRAWINGS

In order to more clearly illustrate the embodiments or the technical solutions in the prior art, the drawings used in the embodiments or the description of the prior art will be briefly described below. Obviously, the drawings in the following description are only for the application. For some embodiments, other drawings may be obtained from those of ordinary skill in the art without departing from the drawings.

DETAILED DESCRIPTION OF PREFERRED EMBODIMENTS

The following description of the various embodiments is provided to illustrate the specific embodiments of the present disclosure. Directional terms mentioned in this application, such as "upper", "lower", "front", "back", "left", "right", "inside", "outside", "side", etc., only refer to the orientation of the drawings. Therefore, the directional terms used are used to describe and understand the present disclosure, and are not intended to limit the present disclosure. In the figures, elements having similar structures are denoted by the same reference numerals.

An embodiment of the present disclosure provides a backlight module and a display module to alleviate the technical problem that a width of a lower frame in a current display module is large.

Figure 1:
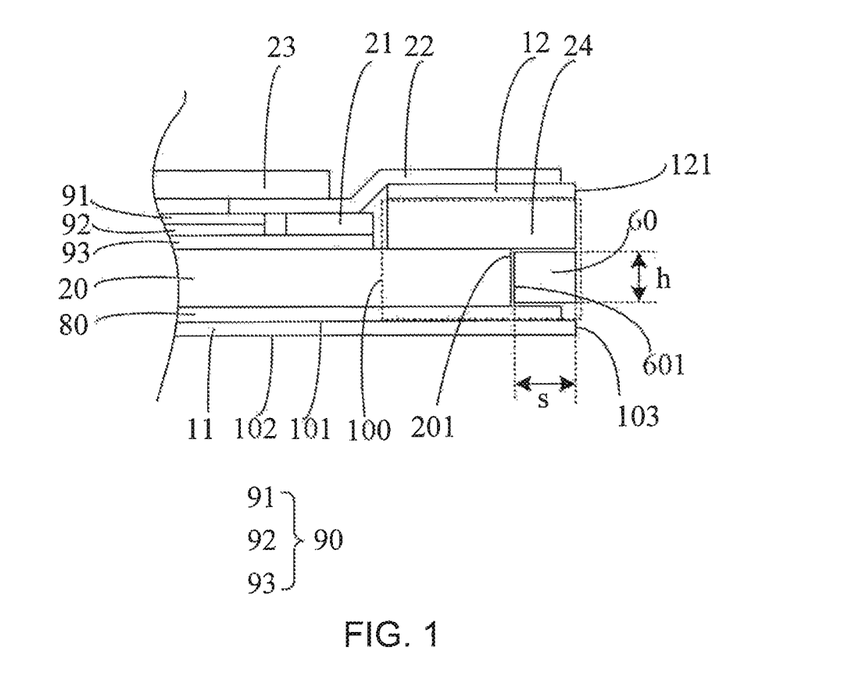
FIG. 1 is a schematic cross-sectional structural view of a backlight module according to an embodiment of the present disclosure.

FIG. 1 is a schematic cross-sectional view of a backlight module according to an embodiment of the present disclosure. An embodiment of the present disclosure provides a backlight module including a back plate 10, a light guide plate 20, and a light source 60.

A receiving cavity is formed in the back plate 10, and a through hole 100 is formed at one side of the back plate 10. The light guide plate 20 is disposed in the receiving cavity, and a light incident surface 201 of the light guide plate corresponds to the through hole 100. The light source 60 is disposed in the through hole 100, and the light source 60 corresponds to the light incident surface 201 of the light guide plate 20.

Figure 2:
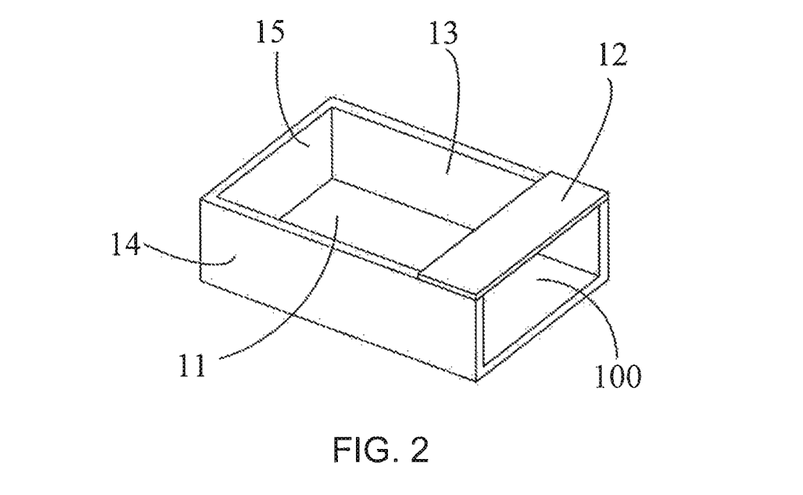
FIG. 2 is a schematic view of a first structure of a back plate of display module according to an embodiment of the present disclosure.

The back plate 10 is a structure in which a plurality of plates are arranged to enclose the receiving cavity, and the through hole 100 is formed therein. There are various ways of forming the through hole 100. In this embodiment, as shown in FIG. 2, the back plate 10 includes a bottom plate 11, a top plate. 12, and a first side plate 13 and a second side plate 14 disposed opposite to each other. The bottom plate 11, the top plate 12, the first side plate 13, and the second side plate 14 are connected to each other to form the through hole 100.

The backlight module in the embodiment of the present application is a side-lit type backlight module, and the light source 60 may be disposed on one side or on opposite sides. When only one side is provided, the back plate 10 forms only one through hole 100, and the back plate 10 further includes a third side plate 15 disposed opposite to the through hole 100. When the light source 60 is disposed on both sides, the backlight 10 does not include the third side plate 15, and another top plate 12 may be disposed at the third side plate 15 to form another through hole 100.

In one embodiment, the top plate 12 is formed separately from other portions of the back plate 10. In a manufacturing process of the backlight module, the bottom plate 11, the first side plate 13, the second side plate 14, and the third side plate 15 of the back plate 10 are first formed by using a stamping process, and then the top plate 12 of an upper layer is formed by an injection molding process, and finally contact surfaces of the two are joined by a pouring point to form the through hole 100, and in a subsequent process, the light source 60 is disposed in the through hole 100.

Figure 3:
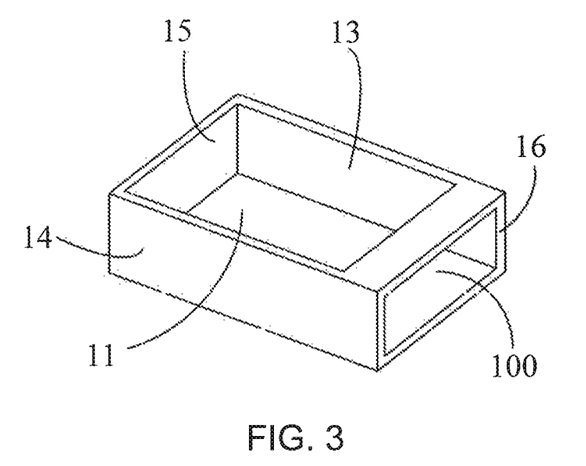
FIG. 3 is a schematic view of a second structure of a back plate of a display module according to an embodiment of the present disclosure.

It is understood that, a structure of the back plate 10 is not limited thereto. In one embodiment, as shown in FIG. 3, a back plate 10 is an integrally formed structure, and the back plate 10 includes a bottom plate 11, a first side plate 13 and a second side plate 14 oppositely disposed, and a third side plate 15 and a fourth side plate 16 oppositely disposed. An inside of the back plate 10 forms a receiving cavity. After a preparation of each of the plates, the through hole 100 is formed in the fourth side plate 16, and in a subsequent process, the light source 60 is disposed in the through hole 100.

As shown in FIG. 1, the first side 121 of the top plate 12 is flush with the second side plate 103 of the bottom plate 11.

The light guide plate 20 is disposed in the receiving cavity and is located on a top surface 101 of the bottom plate 11. The light guide plate 20 converts a side light type horizontal incident light emitted from the light source 60 into vertical outgoing light, and is emitted through a light emitting surface 202 of the light guide plate 20. The light guide plate 20 is generally composed of an optical grade resin material such as thermoplastic resins, polycarbonate, acrylic, and the like.

The display module further includes a reflection plate 80 between the light guide plate 20 and the bottom plate 11. Material of the reflection plate 80 is such as a polyethylene terephthalate (PET) film coated with a high-reflectivity metal film or a combination of upper and lower two layers of PET films containing one core layer including polymer resin having high reflectivity. The main function of the reflection plate 80 is to reflect back the light leaked from the light guide plate 20 to improve utilization of the light source.

An optical film 90 is disposed on the light guide plate 20, and the optical film 90 is disposed in the receiving cavity. A diffusion sheet 91, a prism sheet 92, and a reflective polarizing brightness enhancement film 93 are located on the light emitting surface 202 of the light guide plate 20. The diffusion sheet 91 is made of a PET substrate or a polycarbonate (PC) substrate, and has a smooth front surface and a rough reverse surface. The function of the diffusion sheet 91 is to light the light emitted from a light exit surface 520 of the light guide plate 20. Multiple refractions, reflections, and scattering make the backlight more uniform. The prism sheet 92 is a concentrating device that uses concentrated reflection and refraction laws to concentrate dispersed light within a certain angular range to increase brightness in an emission range. The reflective polarizing brightness enhancement film 93 can also increase brightness of the backlight.

The above three film layers can be made separately or integrally formed. The three film layers integrally formed can effectively reduce a workmanship caused by an assembly, solve a situation in which a foreign matter is incorporated in a manufacturing process, have a thickness thinner than a single film substrate, and effectively reduce a thickness of the display module.

The optical film 90 is provided with a light shielding adhesive 22, and the light shielding adhesive 22 is a light shielding tape having adhesiveness on both sides. One end of the light shielding adhesive 22 is disposed on the optical film 90, and the other end thereof extends to the top plate 12.

In the subsequent assembly process with the display panel, the display panel is disposed on the light shielding adhesive 22. Due to the difference in height between the optical film 90 and the top plate 12, in a region close to the optical film 90, a first support layer 21 and a second support layer 23 are disposed above and below the light shielding adhesive 22, respectively. The first support layer 21 and the second support layer 23 can fill the height difference, so that a setting surface of the display panel is flat and can also serve as a buffer.

In one embodiment, a height of the light guide plate 20 is greater than or equal to a height h of the light source 60. In order to ensure that the light source 60 can be smoothly embedded in the through hole 100, the height of the light guide plate 20 needs to be greater than or equal to the height h of the light source 60 to prevent the light source 60 from rubbing against the reflection plate 80 or the film layer above the light guide plate 20, thereby causing damage.

In one embodiment, a distance between the light incident surface 201 of the light guide plate 20 and the second side surface 103 of the bottom plate 11 is greater than or equal to a length s of the light source 60. In order to ensure that the light source 60 can be smoothly embedded in the through hole 100, the distance between the light incident surface 201 of the light guide plate 20 and the second side surface 103 of the bottom plate 11 needs to be greater than or equal to the length s of the light source 60, such that the light source 60 is prevented from colliding with the light incident surface 601 of the light guide plate 60 to cause damage.

In one embodiment, the backlight module further includes a black and white double-sided adhesive 24 disposed on the light emitting surface 202 of the light guide plate 20 and corresponding to the top plate 12. The black and white double-sided adhesive 24 is used to reflect the light emitted from the light source 60 to the light guide plate 20.

The black and white double-sided adhesive 24 has a white surface facing the light guide plate 10, and a black surface faces the top plate 12. Since the light emitted by the light source 60 is not only directed to the light incident surface 201 of the light guide plate 20, but also toward the other direction, the black and white double-sided adhesive 24 can be used for the light source 60. The emitted light is reflected to the light guide plate 20 and reused, thereby improving the utilization of light.

The white surface of the black and white double-sided adhesive 24 faces the light guide plate 10. The light emitted by the light source 60 can be reflected into the light guide plate 20 under the action of the white surface when the light is applied to the area where the black and white double-sided adhesive 24 is located, that is, the white surface only reflects. The function of the light source 60 is not absorbed by the light source 60, so that the light emitted by the light source 60 can enter the light guide plate 20 as much as possible, thereby increasing the brightness of the surface light source formed by the light guide plate 20 and reducing the light loss to ensure light effect. The black surface of the black and white double-sided adhesive 24 has the function of absorbing light, which can prevent light leakage and ensure the display performance.

In addition, the thickness of the black and white double-sided adhesive 24 is equal to the distance between the top plate 12 and the light guide plate 20, and can support the top plate 12 to a certain extent.

Figure 4:
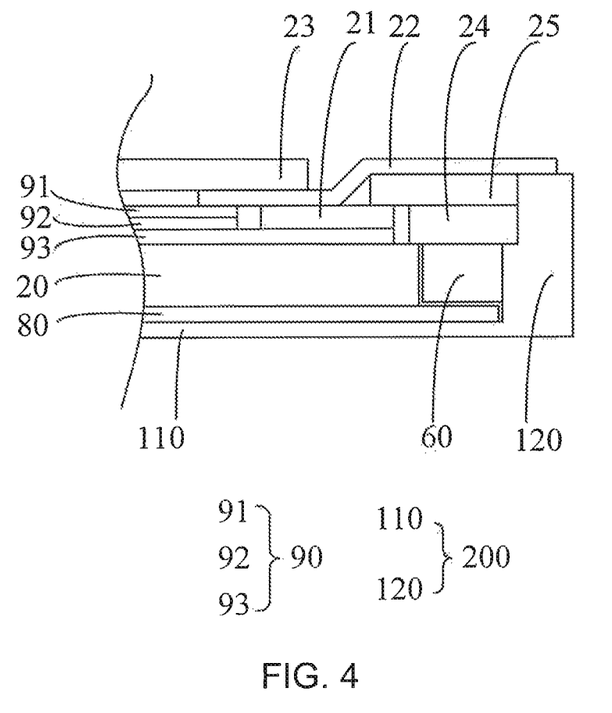
FIG. 4 is a schematic cross-sectional structural view of a backlight module in the prior art.

In the prior art, as shown in FIG. 4, a back plate 200 of a backlight module includes a bottom frame 110 and a side frame 120. A light source 60 is disposed on the side frame 120, and a back frame 310 forms a gap toward a side of the light source 60. The black and white double-sided adhesive 24 and a support layer 25 are disposed on the light source 60 and a notch.

Since the light source 60 is disposed on the side frame 120, and the side frame 120 has a certain thickness, a thickness of a side of the backlight module is relatively large. After being assembled with a display panel, the side frame 120 is located in a lower frame area of the display panel. A width of a lower border area of the display panel is large, which cannot meet the requirements of the narrow border.

In an embodiment of the present application, the through hole 100 is formed on one side of the back plate 10, and then the light source 60 is disposed in the through hole 100. When the position of the light source 60 is ensured, the thickness of the side frame 120 is completely eliminated. After the side frame 120 is assembled with the display panel, a width of a lower border area of the display panel is reduced, and a narrow border is realized.

Figure 5:
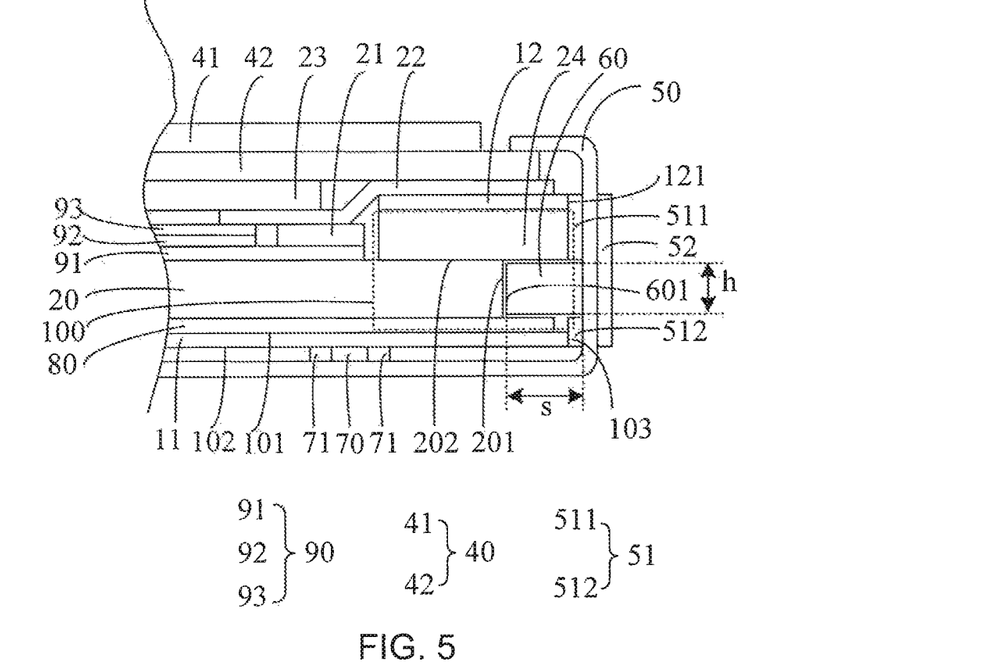
FIG. 5 is a schematic structural view of a first cross section of a display module according to an embodiment of the present disclosure.
Figure 6:
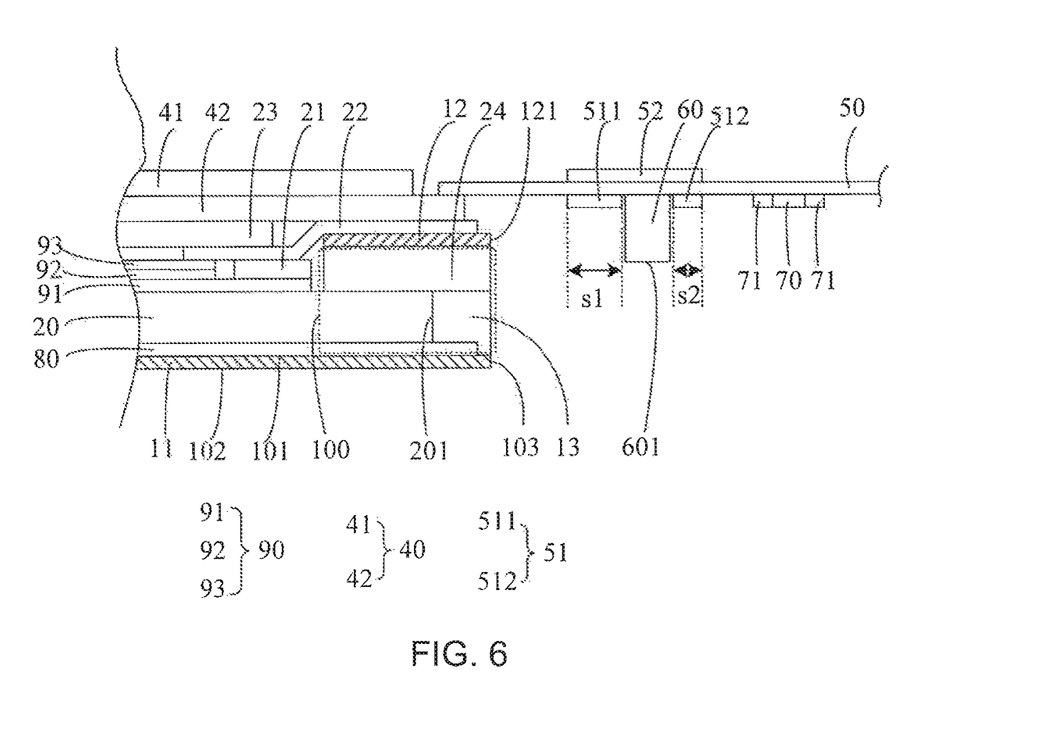
FIG. 6 is a schematic structural view of a second cross section of a display module according to an embodiment of the present disclosure

An embodiment of the present application also provides a display module including a backlight module, a display panel 40, and a flexible circuit board 50. As shown in FIG. 5, a schematic diagram of a first cross-sectional structure of the display module is provided in an embodiment of the present application. The flexible circuit board 50 in FIG. 5 is in a bent state. As shown in FIG. 6, a schematic diagram of a second cross-sectional structure of the display module is provided in an embodiment of the present application. The flexible circuit board 50 in FIG. 6 is in an unfolded state. The display module will be described below with reference to FIGS. 1 and 7.

The receiving cavity is formed in the back plate 10, and the through hole 100 is formed at one side of the backing plate 10. The light guide plate 20 is disposed in the receiving cavity, and the light incident surface 201 of the light guide plate corresponds to the through hole 100. The light source 60 is disposed in the through hole 100, and the light source 60 corresponds to the light incident surface 201 of the light guide plate 20.

The display panel 40 is disposed in the light emitting direction of the backlight module.

The flexible circuit board 50 is bound to the display panel 40 and bent to the bottom surface 102 of the back plate 10 to attached the through hole 100 and the bottom surface 102.

The back plate 10 is a structure in which a plurality of plates are arranged to enclose the receiving cavity, and the through hole 100 is formed therein. There are various ways of forming the through hole 100. In this embodiment, as shown in FIG. 2, the back plate 10 includes a bottom plate 11, a top plate. 12, and a first side plate 13 and a second side plate 14 disposed opposite to each other. The bottom plate 11, the top plate 12, the first side plate 13, and the second side plate 14 are connected to each other to form the through hole 100.

The backlight module in the embodiment of the present application is a side-lit type backlight module, and the light source 60 may be disposed on one side or on opposite sides. When only one side is provided, the back plate 10 forms only one through hole 100, and the back plate 10 further includes a third side plate 15 disposed opposite to the through hole 100. When the light source 60 is disposed on both sides, the backlight 10 does not include the third side plate 15, and another top plate 12 may be disposed at the third side plate 15 to form another through hole 100.

In one embodiment, the top plate 12 is formed separately from other portions of the back plate 10. In a manufacturing process of the backlight module, the bottom plate 11, the first side plate 13, the second side plate 14, and the third side plate 15 of the back plate 10 are first formed by using a stamping process, and then the top plate 12 of an upper layer is formed by an injection molding process, and finally contact surfaces of the two are joined by a pouring point to form the through hole 100, and in a subsequent process, the light source 60 is disposed in the through hole 100.

It is understood that, a structure of the back plate 10 is not limited thereto. In one embodiment, as shown in FIG. 3, a back plate 10 is an integrally formed structure, and the back plate 10 includes a bottom plate 11, a first side plate 13 and a second side plate 14 oppositely disposed, and a third side plate 15 and a fourth side plate 16 oppositely disposed. An inside of the back plate 10 forms a receiving cavity, After a preparation of each of the plates, the through hole 100 is formed in the fourth side plate 16, and in a subsequent process, the light source 60 is disposed in the through hole 100.

The light guide plate 20 is disposed in the receiving cavity and is located on a top surface 101 of the bottom plate 11. The light guide plate 20 converts a side light type horizontal incident light emitted from the light source 60 into vertical outgoing light, and is emitted through a light emitting surface 202 of the light guide plate 20. The light guide plate 20 is generally composed of an optical grade resin material such as thermoplastic resins, polycarbonate, acrylic, and the like.

The display module further includes a reflection plate 80 between the light guide plate 20 and the bottom plate 11. Material of the reflection plate 80 is such as a polyethylene terephthalate (PET) film coated with a high-reflectivity metal film or a combination of upper and lower two layers of PET films containing one core layer including polymer resin having high reflectivity. The main function of the reflection plate 80 is to reflect back the light leaked from the light guide plate 20 to improve utilization of the light source.

An optical film 90 is disposed on the light guide plate 20, and the optical film 90 is disposed in the receiving cavity. A diffusion sheet 91, a prism sheet 92, and a reflective polarizing brightness enhancement film 93 are located on the light emitting surface 202 of the light guide plate 20. The diffusion sheet 91 is made of a PET substrate or a polycarbonate (PC) substrate, and has a smooth front surface and a rough reverse surface. The function of the diffusion sheet 91 is to light the light emitted from a light exit surface 520 of the light guide plate 20. Multiple refractions, reflections, and scattering make the backlight more uniform. The prism sheet 92 is a concentrating device that uses concentrated reflection and refraction laws to concentrate dispersed light within a certain angular range to increase brightness in an emission range. The reflective polarizing brightness enhancement film 93 can also increase brightness of the backlight.

The above three film layers can be made separately or integrally formed. The three film layers integrally formed can effectively reduce a workmanship caused by an assembly, solve a situation in which a foreign matter is incorporated in a manufacturing process, have a thickness thinner than a single film substrate, and effectively reduce a thickness of the display module.

The optical film 90 is provided with a light shielding adhesive 22, and the light shielding adhesive 22 is a light shielding tape having adhesiveness on both sides. One end of the light shielding adhesive 22 is disposed on the optical film 90, and the other end thereof extends to the top plate 12.

The display panel 40 is a liquid crystal display panel, and includes a color filter substrate 41 and an array substrate 42.

Due to the difference in height between the optical film 90 and the top plate 12, in a region close to the optical film 90, a first support layer 21 and a second support layer 23 are disposed above and below the light shielding adhesive 22, respectively. The first support layer 21 and the second support layer 23 can fill the height difference, so that a setting surface of the display panel is flat and can also serve as a buffer.

The display panel 40 is disposed on the second support layer 23. In the area where the top plate 12 is located, the light shielding adhesive 22 is used to connect the top plate 12 and the display panel 40.

In the display panel 40, a width of an array substrate 42 is greater than a width of a color filter substrate 41. In an excess width, the array substrate 42 includes a binding area, and the flexible circuit board 50 is bound to the binding area of the display panel 40. Then, the first side surface 121 of the top plate 12 and the second side surface 103 of the bottom plate 11 are first bent, and then bent along the bottom surface 102 of the bottom plate 11 to finally conform to the through hole 100 and the bottom surface 11.

In one embodiment, the light source 60 is disposed on a side of the flexible circuit board 50 adjacent to the back plate 10. After being bent, the flexible circuit board 50 is embedded in the through hole 100, and the light emitting surface 601 of the light source 60 corresponds to the light incident surface 201 of the light guide plate 20.

The light source 60 is an LED lamp, and the LED lamp is directly disposed on the flexible circuit board 50, and the arrangement is soldering.

In the display module, soldering is a manufacturing process for bonding metal or other materials by heating, high temperature, or high voltage, and conductive bonding between the light source 60 and the flexible circuit board 50 can be relatively easily realized by the light source 60. The surface of the flexible circuit board 50 is in direct contact and soldered, such that the light source 60 is directly powered by the flexible circuit board 50.

There are many forms of welding, which can be laser welding or ultrasonic welding. Other welding methods can be used. The welding method can be selected according to the actual situation of the display module to realize electrical connection between the light source 60 and the flexible circuit board 50.

In addition, in order to achieve electrical conductivity bonding between the light source 60 and the flexible circuit board 50, it is possible to use not only welding but also other connection methods capable of achieving a conductive performance. The conductive combination between the light source 60 and the flexible circuit board 50 can be selected according to the actual situation of the display module. This application does not limit the connection between the two.

In one embodiment, a height of the light guide plate 20 is greater than or equal to a height h of the light source 60. In order to ensure that the light source 60 can be smoothly embedded in the through hole 100, the height of the light guide plate 20 needs to be greater than or equal to the height h of the light source 60 to prevent the light source 60 from rubbing against the reflection plate 80 or the film layer above the light guide plate 20, thereby causing damage.

In one embodiment, a distance between the light incident surface 201 of the light guide plate 20 and the second side surface 103 of the bottom plate 11 is greater than or equal to a length s of the light source 60. In order to ensure that the light source 60 can be smoothly embedded in the through hole 100, the distance between the light incident surface 201 of the light guide plate 20 and the second side surface 103 of the bottom plate 11 needs to be greater than or equal to the length s of the light source 60, such that the light source 60 is prevented from colliding with the light incident surface 601 of the light guide plate 60 to cause damage.

In one embodiment, the display module further includes a reinforcing plate 52 disposed on a side of the flexible circuit board 50 away from the backing plate 10 and corresponding to the light source 60. The reinforcing plate 52 is disposed corresponding to the area where the light source 60 is located, and the area of the reinforcing plate 52 is greater than or equal to the area of the light source 60.

Material of the reinforcing plate 52 is metal. The presence of the metal reinforcing plate will greatly increase the heat dissipation efficiency of the LED light source, and the excess heat between electronic components of the display module and the light source 60 can be guided away in time to reduce operating temperatures of the electronic components and the light source 60 and prevent the brightness of the display module and the efficiency of the electronic components from being affected by excessive temperature.

In one embodiment, the backlight module further includes a black and white double-sided adhesive 24 disposed on the light emitting surface 202 of the light guide plate 20 and corresponding to the top plate 12. The black and white double-sided adhesive 24 is used to reflect the light emitted from the light source 60 to the light guide plate 20.

The black and white double-sided adhesive 24 has a white surface facing the light guide plate 10, and a black surface faces the top plate 12. Since the light emitted by the light source 60 is not only directed to the light incident surface 201 of the light guide plate 20, but also toward the other direction, the black and white double-sided adhesive 24 can be used for the light source 60. The emitted light is reflected to the light guide plate 20 and reused, thereby improving the utilization of light.

The white surface of the black and white double-sided adhesive 24 faces the light guide plate 10. The light emitted by the light source 60 can be reflected into the light guide plate 20 under the action of the white surface when the light is applied to the area where the black and white double-sided adhesive 24 is located, that is, the white surface only reflects. The function of the light source 60 is not absorbed by the light source 60, so that the light emitted by the light source 60 can enter the light guide plate 20 as much as possible, thereby increasing the brightness of the surface light source formed by the light guide plate 20 and reducing the light loss to ensure light effect. The black surface of the black and white double-sided adhesive 24 has the function of absorbing light, which can prevent light leakage and ensure the display performance.

In addition, the thickness of the black and white double-sided adhesive 24 is equal to the distance between the top plate 12 and the light guide plate 20, and can support the top plate 12 to a certain extent.

In one embodiment, the display module further includes an adhesive layer 51 disposed on both sides of the flexible circuit board 50 adjacent to the back plate 10, and located on both sides of the light source 60. The adhesive layer 51 is used for bonding the back plate 10 and the flexible circuit board 50.

As shown in FIG. 5 and FIG. 6, the adhesive layer 51 includes a first bonding portion 511 and a second bonding portion 512, and the first bonding portion 511 is connected to the black and white double-sided adhesive 24 and the first side surface 121 of the top plate 12. The second bonding portion 512 is connected to the second side surface 103 of the bottom plate 11.

After the flexible circuit board 50 is bent, the light source 60 is embedded in the through hole 100. To ensure that the flexible circuit board 50 is closely attached to the bottom plate 11 and the top plate 12, the adhesive layer 51 is disposed on the side of the flexible circuit board 50 near the back plate 10. The adhesive layer 51 includes a first bonding portion 511 and a second bonding portion 512. Since the bottom plate 11 and the top plate 12 are located on both sides of the light source 60, the first bonding portion 511 and the second bonding portion 512 disposed on the flexible circuit board 50 are also located on both sides of the light source 60. The first bonding portion 511 and the second bonding portion 512 may be ring-shaped fixing tapes, or may be other materials having a connecting function.

After the bending, the first bonding portion 511 is connected to the black and white double-sided tape 24 and the first side surface 121 of the top plate 12, and a length s1 of the first bonding portion 511 is greater than or equal to a sum of the thicknesses of the top plate 12 and the black-and-white double-sided adhesive 24 to ensure that the flexible circuit board 50 is better adhered to the top plate 12 and the black and white double-sided adhesive 24.

In one embodiment, as shown in FIG. 5, an upper edge of the reinforcing plate 52 is flush with an upper edge of the first bonding portion 511, and a lower edge of the reinforcing plate 52 is flush with a lower edge of the second bonding portion 512, so that when the flexible circuit board 50 is connected to the first side 121 of the top plate 12, the black and white double-sided adhesive 24, and the second side 103 of the bottom plate 11, the reinforcing plate 52 can be aligned and attached, which is simple and easy.

In one embodiment, the flexible circuit board 50 further includes a reflective area disposed around the light source 60, and the reflective area is provided with a reflective film (not shown). Material of the reflective film may be white oil. The function of the reflective film is similar to that of the black-and-white double-sided adhesive 24, and is used to reflect the light emitted from the light source 60 to the light guide plate 20 to improve light utilization. The reflective area is disposed around the light source 60. A reflective film can be placed in an area where light can be irradiated on the flexible circuit board 50.

In one embodiment, the display module further includes a driving chip 70 disposed on a side of the flexible circuit board 50 adjacent to the backing plate 10 to be in conformity with the bottom surface 102.

The driving chip 70 is wound on the side of the flexible circuit board 50 near the back plate 10. The driving chip 70 in a flat state is farther from the display panel 40 than the power source 60. Both sides of the driving chip 70 are provided with a sponge rubber 71 which is bonded to the bottom surface 102 of the bottom plate 11.

Figure 7:
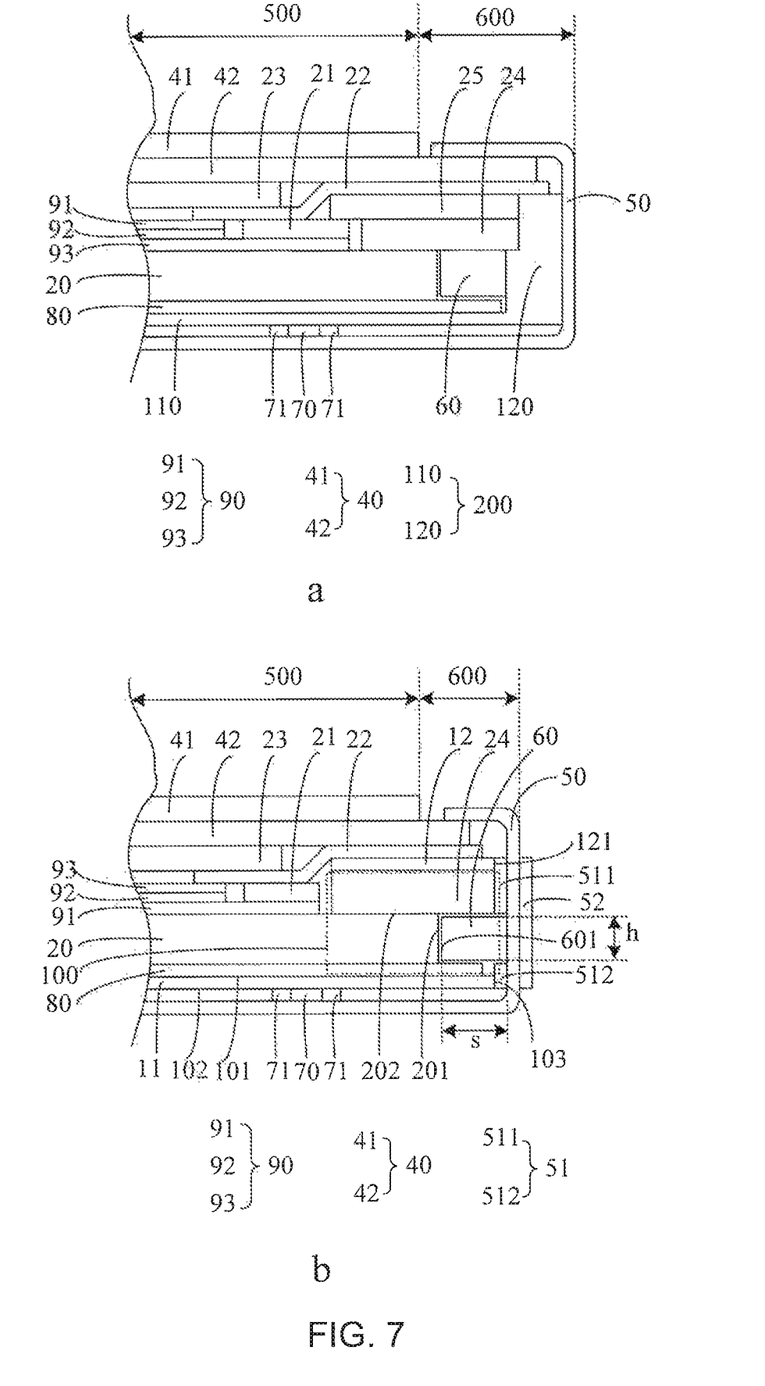
FIG. 7 is a schematic view showing a cross-sectional structure of a display module in the prior art and an embodiment of the present disclosure.

FIG. 7 is a schematic view showing a cross-sectional structure of a display module in the prior art and an embodiment of the present disclosure, wherein a in FIG. 7 is a schematic cross-sectional structure of a display module in the prior art, and b in FIG. 7 is a schematic cross-sectional view of a display module in an embodiment of the present disclosure.

In the prior art, as shown in a of FIG. 7, the display module includes a bottom frame 110 and a back frame 310. The light source 60 is disposed on the back frame 310, and the back frame 310 forms a gap toward the side of the light source 60. The black and white double-sided adhesive 24 and the support layer 25 are disposed on the light source 60 and a notch.

The display module includes a display area 500 and a lower frame area 600. After the flexible circuit board 50 is bent to the bottom surface 1102 of the bottom frame 110, the distance from the display area to the display module frame is large due to the presence of the back frame 310. The width of the lower frame area 600 is large and cannot meet the requirements of the narrow bezel.

As shown in b of FIG. 7, an embodiment of the present application punches the light source 60 into the flexible circuit board 50, and is embedded in the through hole 100 formed by the back plate 10 and the top plate 12, and no additional back frame 300 is needed in the lower frame area 600. With respect to the prior art, the thickness of the back frame 310 is reduced, that is, the width of the lower frame area 600 is reduced, thereby achieving an ultra-narrow bezel of the display module, thereby improving market competitiveness.

In addition, in the prior art, the light source 60 is disposed on the back frame 310, and the light source 60 is driven by the driving circuit on the flexible circuit board 50, and the light source 60 is soldered to a sub-flexible circuit board. The sub-circuit board is then soldered to the flexible circuit board 50, and the light source 60 is illuminated by the power supply of the flexible circuit board 50. The use of welding processes is prone to poor and slower.

An embodiment of the application directly places the light source 60 on the flexible circuit board 50, and trace of the light source 60 is also directly disposed on the flexible circuit board 50, so that no additional sub-flexible circuit board is needed. The welding process between the sub-flexible circuit board and the flexible circuit board 50 can be eliminated, the work efficiency is improved, the welding defect is eliminated, and the process yield of the module is finally improved.

According to the above embodiment, an embodiment of the present invention provides a backlight module and a display module. The backlight module includes a back plate, a light guide plate and a light source. The back plate defines a receiving cavity. One side of the back plate is formed with a through hole. The light guide plate is formed. The light incident surface of the light guide plate is disposed in the through hole; the light source is disposed in the through hole, and the light source corresponds to a light incident surface of the light guide plate. By forming a through hole on one side of the back plate and disposing the light source in the through hole, the side frame is not required to be disposed at the light source, and the thickness of the original side frame is completely eliminated, thereby reducing the thickness of the backlight module frame. After assembling the display module with the display panel, the width of the lower frame of the display module is reduced, and a narrow bezel design is realized.

In the above, although the present application has been disclosed in the above preferred embodiments, the preferred embodiments are not intended to limit the application, and those skilled in the art can make various modifications without departing from the spirit and scope of the application. The invention is modified and retouched, and the protection scope of the present application is determined by the scope defined by the claims.

What is claimed is:

1. A backlight module, comprising:
   a back plate comprising a receiving cavity disposed therein, wherein a side of the back plate is provided with a through hole;
   a light guide plate disposed in the receiving cavity, wherein a light incident surface of the light guide plate corresponds to the through hole; and
   a light source disposed in the through hole, wherein the light source corresponds to the light incident surface of the light guide plate;
   wherein the back plate comprises a bottom plate, a top plate, and a first side plate and a second side plate that are oppositely disposed, the bottom plate, the first side plate, the second side plate, and the top plate are connected to each other to form the through hole.

2. The backlight module according to claim 1, wherein the top plate is formed separately from other portions of the back plate.

3. The backlight module according to claim 1, wherein a distance between the light incident surface of the light guide plate and a second side surface of the bottom plate is greater than or equal to a length of the light source.

4. The backlight module according to claim 1, wherein a height of the light guide plate is greater than or equal to a height of the light source.

5. The backlight module according to claim 1, wherein a first side surface of the top plate is flush with a second side surface of the bottom plate.

6. The backlight module according to claim 1, further comprising a black and white double-sided tape disposed on a light emitting surface of the light guide plate and corresponding to the top plate.

7. A display module, comprising:
   a backlight module comprising a back plate, a light guide plate, and a light source, wherein the back plate comprises a receiving cavity disposed therein, a side of the back plate is provided with a through hole, the light guide plate is disposed in the receiving cavity, a light incident surface of the light guide plate corresponds to the through hole, the light source is disposed in the through hole, and the light source corresponds to the light incident surface of the light guide plate;
   a display panel disposed in a light emitting direction of the backlight module; and a flexible circuit board bound to the display panel and bent to a bottom surface of the back plate to be attached to the through hole and the bottom surface of the back plate;

wherein the light source is disposed on a side of the flexible circuit board adjacent to the back plate;

wherein the back plate comprises a bottom plate, a top plate, and a first side plate and a second side plate that are oppositely disposed, the bottom plate, the first side plate, the second side plate, and the top plate are connected to each other to form the through hole.

8. The display module according to claim 7, wherein the top plate is formed separately from other portions of the back plate.

9. The display module according to claim 7, wherein a distance between the light incident surface of the light guide plate and a second side surface of the bottom plate is greater than or equal to a length of the light source.

10. The display module according to claim 7, wherein a height of the light guide plate is greater than or equal to a height of the light source.

11. The display module according to claim 7, wherein a first side surface of the top plate is flush with a second side surface of the bottom plate.

12. The display module according to claim 7, wherein the backlight further comprises a black and white double-sided tape disposed on a light emitting surface of the light guide plate and corresponding to the top plate.

13. The display module according to claim 7, further comprising an adhesive layer disposed on a side of the flexible circuit board adjacent to the back plate and located at two sides of the light source, wherein the adhesive layer is configured to bond the back plate and the flexible circuit board.

14. The display module according to claim 7, wherein the flexible circuit board comprises a reflective area disposed around the light source, and the reflective area is provided with a reflective film.

15. The display module according to claim 7, further comprising a reinforcing plate disposed on a side of the flexible circuit board away from the back plate and corresponding to the light source.

16. The display module according to claim 15, wherein the reinforcing plate is made of metal.

17. The display module according to claim 7, further comprising a driving chip disposed on a side of the flexible circuit board adjacent to the back plate and attached to the bottom surface of the back plate.

* * * * *